United States Patent [19]

Weik

[11] Patent Number: 4,926,416
[45] Date of Patent: May 15, 1990

[54] METHOD AND FACILITIES FOR HYBRID PACKET SWITCHING

[75] Inventor: Hartmut Weik, Stuttgart, Fed. Rep. of Germany

[73] Assignee: Alcatel N.V., Amsterdam, Netherlands

[21] Appl. No.: 286,306

[22] Filed: Dec. 16, 1988

[30] Foreign Application Priority Data

Dec. 18, 1987 [DE] Fed. Rep. of Germany ....... 3742939

[51] Int. Cl.$^5$ .............................................. H04J 3/26
[52] U.S. Cl. .................................................. 370/60.1
[58] Field of Search ................... 370/60, 85, 94, 60.1, 370/94.1, 94.2

[56] References Cited

U.S. PATENT DOCUMENTS

| 4,569,041 | 2/1986 | Takeuchi et al. ...................... 370/60 |
| 4,592,048 | 5/1986 | Beckner et al. . |
| 4,679,190 | 7/1987 | Dias et al. . |
| 4,698,802 | 10/1987 | Goke et al. . |
| 4,707,826 | 11/1987 | Froggatt . |
| 4,761,781 | 8/1988 | Calvignac et al. .................. 370/94.2 |
| 4,785,446 | 11/1988 | Dias et al. ............................... 370/60 |
| 4,819,230 | 4/1989 | Calvignac et al. ...................... 370/94 |

FOREIGN PATENT DOCUMENTS 2139852 11/1984 United Kingdom .

OTHER PUBLICATIONS

"System 12 Dual Switch Port", Electrical Communication, vol. 59 ½, 1985, pp. 54–60.
Thomas et al., Asynchronous Time–Division Techniques: An Experimental Packet Network Integrating Videocommunication, ISS '84 Florence, 7–11, May 1984.
W. Schmidt, "Die Vermittlungstechnik in Integrieten Paket–Übermittlungs' System", Parts 1 and 2: Der Fermelde–Ingenerur: Sep./Oct. 87, Sect. 3.4, Fig. 4, p.9.

Primary Examiner—Douglas W. Olms
Assistant Examiner—Melvin Marcelo
Attorney, Agent, or Firm—Christie, Parker & Hale

[57] ABSTRACT

In fast packet-switching networks, packets of particular connections (CS1, CS2) (e.g., voice, moving-image) are to be treated with priority over packets of other connections (PS1, PS2, PS3) (e.g., data) (without delay jitter and loss of information). Prior art arrangements are divided into a circuit-switching portion (for CS1, CS2) and a packet-switching portion (for PS1, PS2, PS3). The circuit-switching portion operates on a time-division multiplex basis. On each incoming line, 70 packets each containing 40 octets, for example, are combined into a frame. If no special steps were taken, delays on the order of 40×70×8 bits=22,400 bits would result in each switching stage; for each input of a switching stage, 22,400 bits of storage would be necessary. According to the invention, all packets are divided within the exchange, into subpackets of equal length and distributed to subframes. Switching takes place on the basis of subframes. Delays and memory location requirements are reduced in the ratio of frames:subframes. Preferably, the connections (CS1, CS2) to be treated with priority are assigned fixed positions in each frame and each subframe throughout the call. Subpackets of the other packets are preferably inserted in sequence into free positions, and are recombined into complete packets within each switching stage.

9 Claims, 8 Drawing Sheets

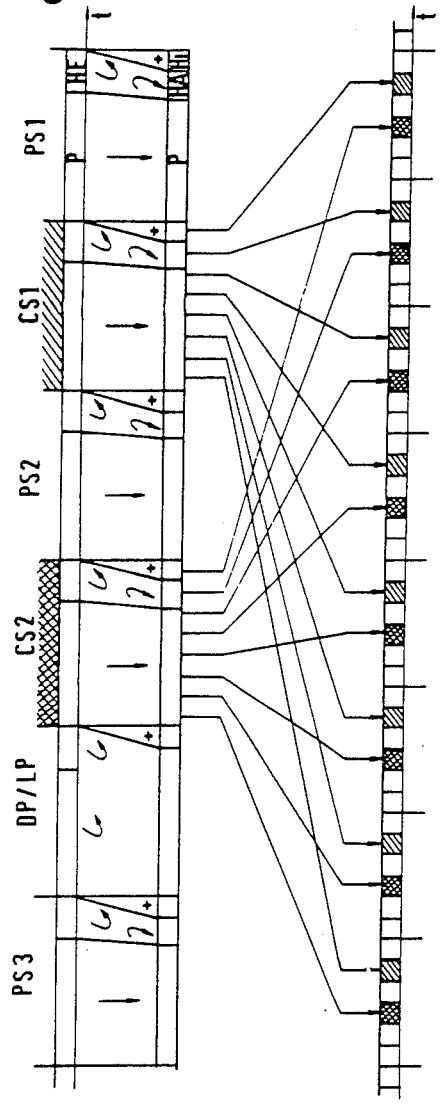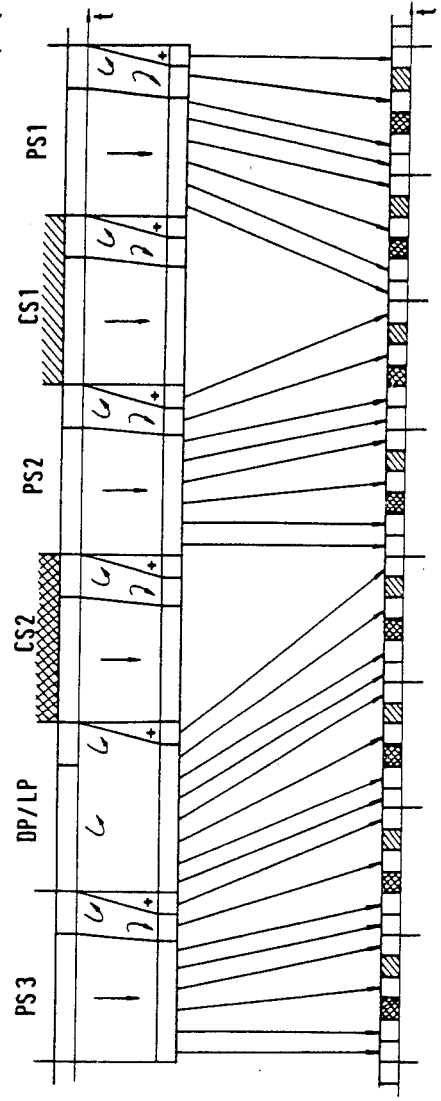

METHOD AND FACILITIES FOR HYBRID PACKET SWITCHING

TECHNICAL FIELD

The present invention relates to a method for switching messages divided into packets of uniform length, and to facilities therefor.

CROSS REFERENCE TO RELATED APPLICATIONS

Other applications of the concepts underlying the present invention are disclosed in the commonly assigned U.S. patent application of inventors G. Eilenberger et al. entitled "PACKET-SWITCHING FACILITIES", filed concurrently herewith under Ser. No. 07/286,305. To the extent such copending application may contain any additional information that might be of any assistance in the use and understanding of the invention claimed herein, it is hereby incorporated by reference.

CLAIM FOR PRIORITY

This application is based on and claims priority from an application first filed in Fed. Rep. Germany on 12/18/87 under Ser. No. P37 42 939.6. To the extent such prior application may contain any additional information that might be of any assistance in the use and understanding of the invention claimed herein, it is hereby incorporated by reference.

BACKGROUND ART

"Der Fernmelde=Ingenieur", vol. 42, No. 9, September 1987, especially item 3.4 on pages 8 and 9 discloses method and apparatus for switching messages in the form of uniform length packets. European patent Publication No. EP-A2-0 125 744 "Closed Loop Telecommunication System" describes a ring system in which a complete frame containing a plurality of packets circulates at all times, using shift registers or other memories.

The increasing diversity of telecommunication services necessitates a highly flexible switching system. For this purpose, fast packet-switching systems, in which the data are handled in packet form, are being considered in particular. In such systems, delays, delay jitter, and packet losses cannot be excluded. To this, however, the individual telecommunication services are differently susceptible. For example, data services which detect the loss of a packet and can call for this packet anew are far less susceptible to packet losses than voice or moving-image services, which must evaluate the incoming information immediately (electroacoustic or electrooptical conversion) and in which losses and delay jitter cause disturbances.

It is known to use packets of uniform length in a packet transmission system, to combine these packets into periodically recurring frames, to assign fixed positions within the frames to messages to be treated with priority, and to switch these messages to be treated with priority using synchronous time-division multiplexing as is commonly done in circuit-switching systems, while the other packets are packet-switched in the usual manner.

For the messages to be treated with priority, a synchronous transfer mode (STM) is obtained. The individual packets are called "STM cells". For the other messages, an asynchronous transfer mode (ATM) is obtained, in which the individual packets are called "ATM cells". In connection with the synchronous transfer mode, terms such as "circuit switching" (CS) and "CS packets" are used; in connection with the asynchronous transfer mode, terms such as "packet switching" (PS), "PS packets", "asynchronous time division" (ATD), and "fast packet switching" are used. Combinations are called "hybrids".

However, a packet inevitably contains more bits than a time slot in conventional time-division multiplex systems. Frames containing about 70 40-octet packets, i.e., about $40 \times 70 \times 8$ bits$=22,400$ bits, are currently under discussion. In conventional time-division multiplex systems, frames with 32 16-bit time slots, i.e., 512 bits, are commonly used. Since in a synchronous time-division multiplex switching system one complete frame per input must be temporarily stored in each time switch, the amount of storage required increases considerably. Moreover, delays of the order of one frame occur. If, as is to be expected, the frame repetition rate is the same in both cases (8 kHz), the memories will have to be not only considerably larger but also correspondingly faster. Speed reduction by parallel instead of serial processing is possible only to a very limited extend if at all.

DISCLOSURE OF INVENTION

It is the object of the present invention to improve a hybrid packet-switching method of the above kind in such a way as to reduce the requirement for fast memories, and to provide the facilities necessary therefor.

According to the invention, all packets are thus divided, within the exchange, into subpackets of equal length and distributed to subframes. Switching takes place on the basis of the subframes. Delays and memory location requirements within the switching network are reduced in the ratio of frames:subframes. The speed within the switching network is preserved. For each input line and each output line, a sorter is necessary to temporarily store one frame at a time. Since, unlike in a switching stage, it is not necessary to store several frames in the same memory, slower memories than those in the switching stages can be used. Already in a three-stage switching network, however, not only the required number of fast memories but the total requirement for memories is reduced.

The fundamental idea of the invention is that the division of the packets into subpackets yields effectively shorter "packets", which result in a corresponding reduction of the amount of storage required. However, since only the first subpackets contain path information, the interrelationship and, thus, the equal treatment of subpackets belonging together must be ensured in a different manner. Instead of being inserted into the data stream at a random point as is usual with packets, the individual subpackets follow one another according to a predetermined pattern, with STM cells and ATM cells being preferably treated differently. In order that the effective shortening of the packets can produce the desired effect, subpackets belonging together must not follow one another directly but must alternate with subpackets of other packets.

Further advantageous aspects of the invention are claimed in the subclaims. Other embodiments of the same fundamental idea are contained in applicant's simultaneously filed patent application Ser. No. 07/286,305, "Einrichtungen zur Paketvermittlung" (Packet Switching Facilities).

While the invention will be described using terms which are applied primarily to centrally located switching facilities—the following embodiment represents a central switching facility, too—it is equally applicable to decentralized switching systems, such as ring systems. Reference is made to the above-mentioned article from "Der Fernmelde=Ingenieur", where bus and ring systems under 4.1.2 are subordinated to the switching arrangements under 4, and the above-mentioned European patent publication No. EP-A2-0 125 744, "Closed loop telecommunication system", which describes a ring system in which a complete frame containing a plurality of packets circulates at all times, which requires shift registers or other memories.

BRIEF DESCRIPTION OF DRAWINGS

An embodiment of the invention will now be explained with reference to the accompanying drawings, in which:

FIG. 1 shows the sequence of operations at the input of an exchange with respect to the STM cells;

FIG. 2 supplements FIG. 1 with respect to the ATM cells;

BEST MODE FOR CARRYING OUT THE INVENTION

Figure 3:
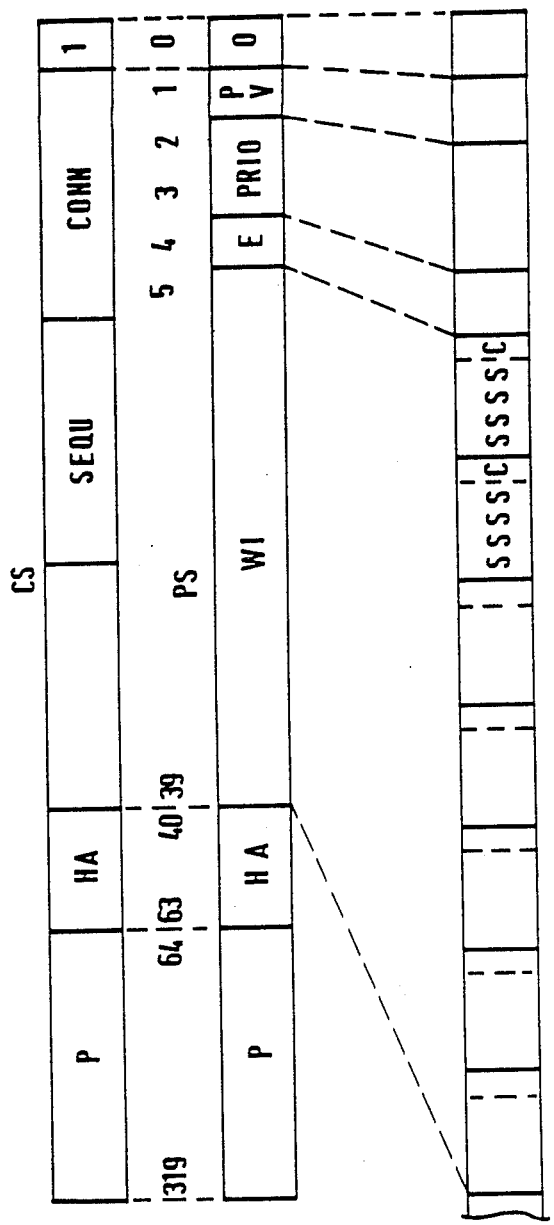
FIG. 3 shows the structures of STM and ATM cells.

First, the principle of the invention will be explained with the aid of FIGS. 1 and 2. FIG. 1 shows the treatment of the packets to be treated with priority, while FIG. 2 shows the treatment of the other packets.

It is assumed that a frame contains six packets of eight octets each (each octet containing 8 bits). In the example, positions 1, 3, and 6 contain packets to be packet-switched, PS1, PS2, and PS3. Positions 2 and 4 contain packets to be circuit-switched, CS1 and CS2. Position 5 contains a control packet DP or an empty packet LP.

Each packet consists of an information field ("payload") P and a preceding label (header). The label is a piece of information for the next exchange. Therefore, the incoming label HE is first replaced by an outgoing label HA. To this outgoing label is added an internal label Hi which serves to distinguish between the types of packets and contains call-associated information.

The incoming packets (first row in FIGS. 1 and 2) are stored along with the outgoing label HA and the internal label Hi (second row in FIGS. 1 and 2). This information is then read out in a changed order (third row in FIGS. 1 and 2). The readout is shifted in time by one frame, but in the representation it is not shifted.

Within the exchange (third row), the frame is divided into 8 subframes containing six octets each. The packets to be treated with priority, CS1 and CS2, are switched through synchronously; they will therefore be referred to as "STM cells". Each STM cell is assigned an octet in the same position within each subframe, so that the STM cell occupying the second position in the frame, CS1, is divided octet by octet among the respective second positions of the subframes. Similarly, the fourth positions are assigned to the STM cell CS2.

The assignment between an entire packet in the frame and the subpackets in the subframes can also be made differently, but it must always be unambiguous. It may be advantageous, for example, to retain the position in the subframes during a call even if the position in the frame changes during the call.

When the subframes are occupied with the octets of the STM cells, as shown in FIG. 1, the octets of the other packets are sorted, in their original order, into those positions of the subframes which are not occupied by subpackets (octets) belonging to STM cells, as shown in FIG. 2. These packets are switched through asynchronously and they also arrive asynchronously from outside. They will therefore be called "ATM cells". In principle, the ATM cells, too, could be processed synchronously during a frame period, but the asynchronous mode is preferred here.

Empty packets, LP, i.e., time intervals in the frame which contain no information, and control information, DP, are treated like ATM cells, but they may be sorted out or added within the exchange.

In the present embodiment, the information contained in one frame prior to the re-sorting is re-sorted so as to be completely contained in one frame after the re-sorting. However, this need not necessarily be so.

The structures of an STM cell, CS, and an ATM cell, PS, will now be explained with the aid of FIG. 3. The representation is not true to scale. Both types of packets have a three-part structure, with the first five octets, i.e., the bits 0 to 39, representing the internal label Hi, the three next octets, i.e., the bits 40 to 63, representing the outgoing label HA, and the remaining 32 octets, i.e., the bits 64 to 319, representing the information field P. Bit 0 serves to distinguish between STM and ATM cells.

In STM cells, bit 0 is a "1", which is followed by a connection number (5 bits), CONN, and a serial number (5 bits), SEQU, within the connection. The remaining bits of the internal label Hi are unused in STM cells.

In ATM cells, bit 0 is a "0", which is followed by a "packet-valid" bit PV, two priority bits PRIO, an unused bit E, and a path-information field WI. As shown in the third row of FIG. 3, the path-information field WI contains 5 bits of path information for each of seven successive stages. The respective first bit is a control bit C which, in the case of control packets, marks the stage for which the packet is intended. The four following bits specify an output address SSSS.

Figure 4:
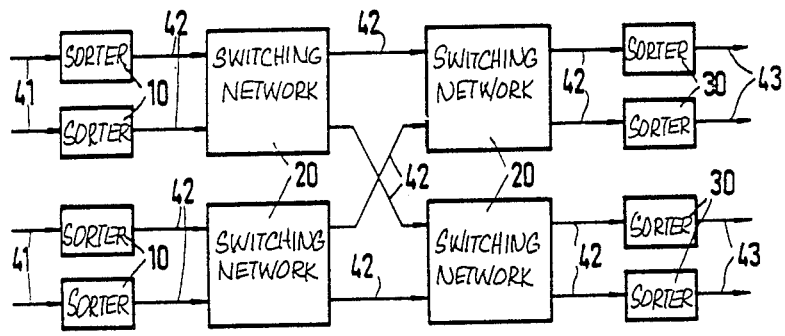
FIG. 4 shows the structures of a switching facility according to the invention.

FIG. 4 shows a simple switching facility in accordance with the invention. The facility has four switching networks 20 which are arranged in two like stages and each have two input lines 42 and two output lines 42. Each of the switching networks 20 of the first stage is connected to both switching networks 20 of the second stage. An input sorter 10 is inserted between each input line 41 of this switching facility and the associated input line 42 of the switching network 20 of the first stage. At the output of the switching facility, output sorters 30 are inserted between the output lines 42 of the switching networks 20 of the last, here the second, stage and the output lines 43 of the switching facility.

Figure 5:
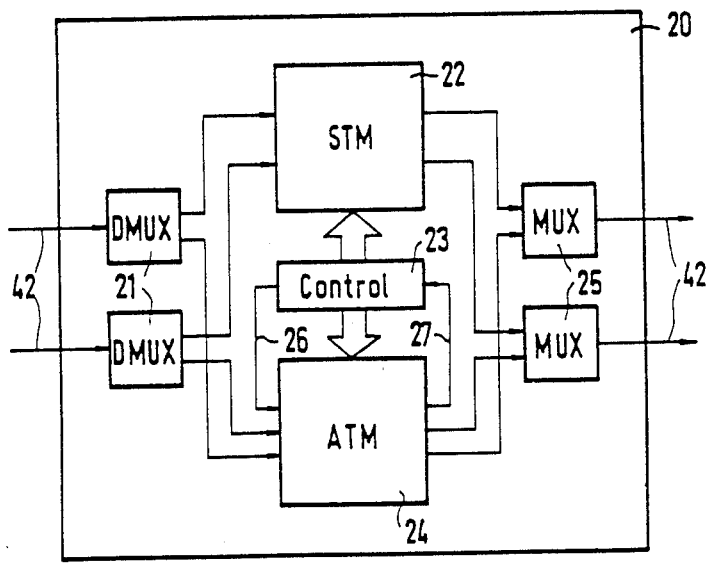
FIG. 5 is a block diagram of a single switching network.

FIG. 5 shows an individual switching network 20 with two input lines 42, two output lines 42, two demultiplexers 21, a synchronous switching element 22, an asynchronous switching element 24, a controller 23, two multiplexers 25, and two control-packet lines 26 and 27.

Each input line 42 has a demultiplexer 21 associated with it. The example shows two input lines and two demultiplexers, but switching networks with 16 inputs and outputs, i.e., 16 input lines, 16 demultiplexers, 16 multiplexers, and 16 output lines, are preferred.

Each demultiplexer 21 synchronizes the incoming data stream, converts it octet by octet from serial to parallel form, and passes it to the synchronous switching element 22 or the asynchronous switching element 24. The decision is made with the aid of a table in which the time slots to be switched through synchronously are marked. This table can either be updated from the controller 23 or formed anew each time by evaluating the first subframe of each frame.

In the example being described, the synchronous switching element 22 has two inputs and two outputs; 16 inputs and 16 outputs are preferred. In conventional time-division multiplex systems, switching can be effected from each input time slot of each input to each output time slot of each output. One subframe must be stored for each input. The synchronous switching element 22 is controlled by the controller 23. The control information passes through the asynchronous switching element 24. Such a synchronous switching element, which was implemented for a different transmission speed and a different application, however, is described in an article by W. Frank et al, "SYSTEM 12-Doppelport des Koppelnetzbausteins", Elektrisches Nachrichtenwesen, Vol. 59, No. 1/2, 1985.

In the example, the asynchronous switching element 24 has three inputs and three outputs; 17 inputs and 17 outputs are preferred. One of the inputs and one of the outputs is connected to the controller 23 by the control-packet lines 26 and 27, respectively. To realize the asynchronous switching element 24, any single-stage packet-switching network can be used. Sufficient examples are described in the above-mentioned issue of the journal "Der Fernmelde=Ingenieur" and in the subsequent issue, No. 10, October 1987. The only additional steps that have to be taken are to construct the packets from the successively arriving subpackets and then divide them again.

The multiplexers 25 insert the subpackets coming from the asynchronous switching element 24 into the gaps of the data streams coming from the synchronous switching element 22. If necessary, empty packets are inserted. Also inserted is any additional information for synchronization, frame identification, or subframe identification. This is followed by a reconversion into a serial data stream.

Over all input and output lines, 41, 42 and 43, both ATM and STM cells are transferred together. They are treated differently in all devices, i.e., input and output sorters 10, 30 and switching networks 20. In the input sorters 10 and the output sorters 30, this different treatment is ensured by different control, while in the switching networks 20, separate branches are provided therefor. Neither is an absolute requirement, but both are advantageous since, because of the much greater throughput in the switching networks 20, a division must take place there anyhow.

In the following, some of these devices will be described in greater detail.

Figure 6:
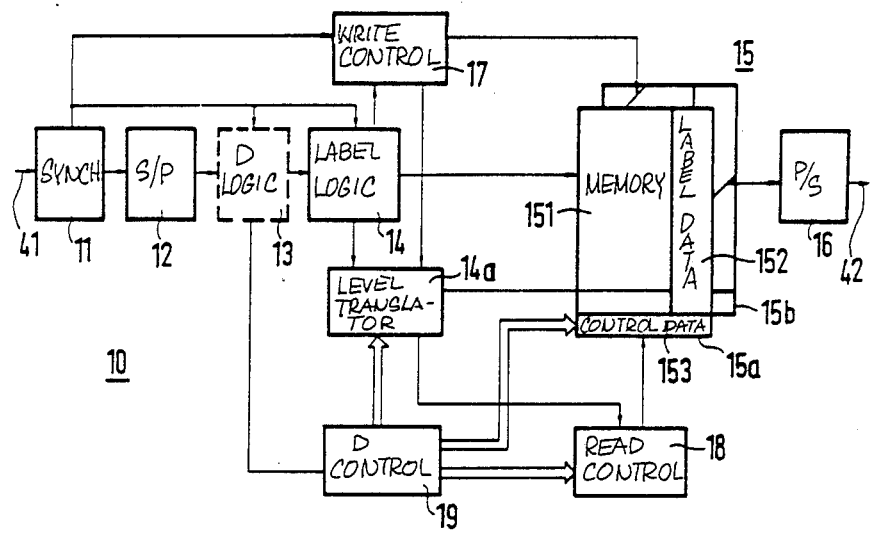
FIG. 6 is a block diagram of an input sorter.

The input sorter 10, shown in FIG. 6, contains a synchronizer 11, a serial-parallel converter 12, a D-channel readout logic 13, a label readout logic 14 having a level translator 14a associated therewith, an input memory 15 consisting of two like parts 15a and 15b, a parallel-serial converter 16, a write control 17, a read control 18, and a controller 19. The normal information flow is from the synchronizer 11 at the input through the serial-parallel converter 12, the D-channel readout logic 13, the label readout logic 14, the input memory 15, and the parallel-serial converter 16 to the output.

The synchronizer 11 performs bit and frame synchronization, thereby synchronizing the entire input sorter 10, particularly the D-channel readout logic 13, the label readout logic 14, the write control 17, and the read control 18.

The D-channel readout logic 13 recognizes D-channel packets by the incoming label HE, passes them to the controller 19, and forwards an empty packet instead (unchanged information field marked as invalid).

The label readout logic 14 separates the incoming labels HE from all incoming packets and sends them to the label translator 14a.

The label translator 14a replaces each incoming label HE by the associated outgoing label HA and the associated internal label Hi on the basis of a table, and writes the labels HA and Hi into the input memory 15 under control of the write control 17. The table is written by the controller 19.

The input memory 15 consists of two like parts 15a and 15b. Data is written into one of the parts under control of the write control 17, while the other part is read from under control of the read control 18. On the next frame, the respective other part is written into or read from, respectively.

Each part of the input memory consists of three portions, a main portion 151, into which the information fields of the packets are written, a label portion 152, into which the label translator 14a writes, and a control-data portion 153, into which data is written under control of the controller 19 and which contains, inter alia, information for synchronization and for frame and subframe identification.

Figure 8:
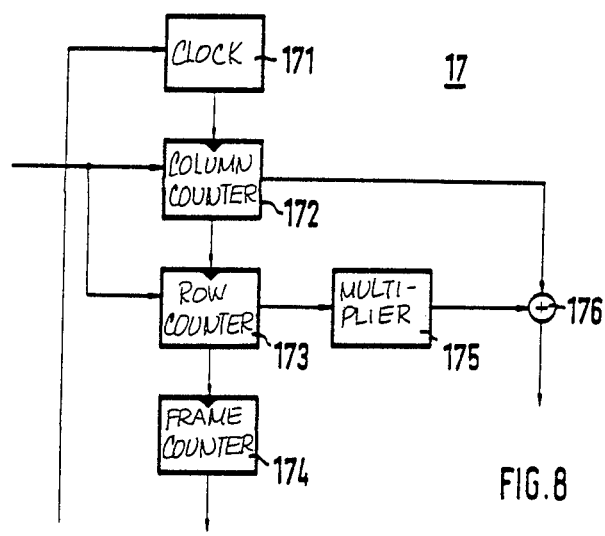
FIG. 8 is a block diagram of a write control for the input sorter of FIG. 6.

The write control 17 is shown in FIG. 8. It computes the addresses of the locations of the input memory 15 into which the incoming packets are written. It makes no distinction between ATM and STM cells. It includes a clock generator 171, a column counter 172, a row counter 173, and a frame counter 174.

The write control 17 controls the writing into the main portions 151 of the input memory 15. The column counter 172 counts the octets of a packet, and the row counter 173 counts the packets of a frame. Both are reset by the synchronizer 11 at the beginning of a frame. The row counter 173 is clocked by the overflow of the column counter 172. The clock generator 171 stops when a label occurs in the incoming data stream. This is controlled by the label readout logic 14. The contents of the row counter 143 are multiplied by the number of columns (=number of octets in an information field) in a multiplier 175 and added to the contents of the column counter 172 in an adder 176. The result is the input address.

Re-sorting takes place during readout from the input memory 15 and is controlled by the read control 18.

Figure 9:
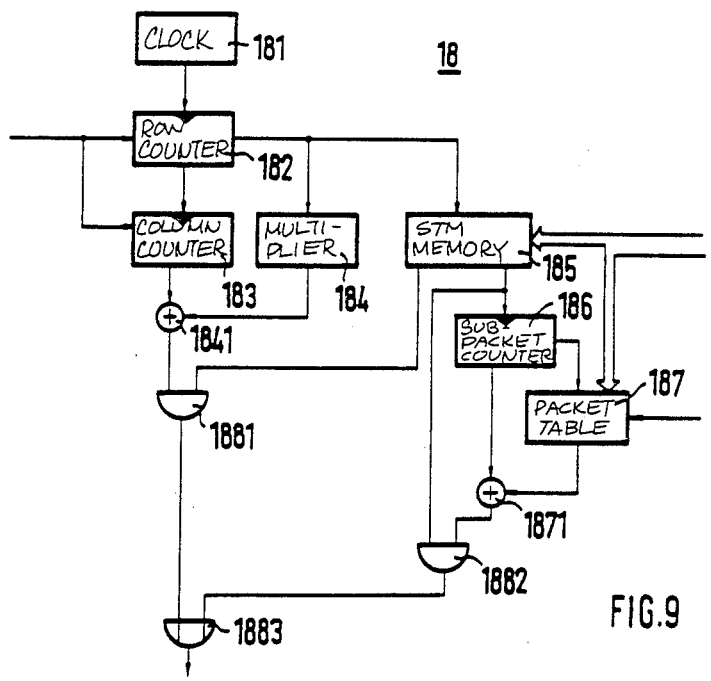
FIG. 9 is a block diagram of a read control for the input sorter of FIG. 6.

The read control 18 is shown in FIG. 9. It computes the addresses of the locations of the input memory 15 from which the outgoing octets are read. It distinguishes between ATM and STM cells. The read control 18 includes a clock generator 181, a row counter 182, a column counter 183, a multiplier 184, an STM connection memory 185, a subpacket counter 186, and a packet memory table 187.

The read control 18 controls the readout from the input memory 15. The row counter 182 determines the row of an STM octet to be read, and the column counter 183 the column. The column counter 183 is clocked by the overflow of the row counter 182. The row counter 182 is clocked by the clock generator 181. The contents of the row counter 182 are multiplied by the number of columns (in the internal cell format) in a multiplier 184 and added to the contents of the column counter 183 in an adder 1841. The row counter 182 determines in the STM connection memory 185 whether the respective row is a row of STM or ATM character. If the value in the table is 1, i.e., STM, the address will be applied through an AND gate 1881 and an OR gate 1883 to the portion of the input memory 15 to be read from. If the value in the table is 0, i.e., ATM, the subpacket counter 186 will be clocked by a pulse. The overflow of the subpacket counter 186 causes the next packet memory address to be set in the packet memory table 187. From the contents of the subpacket counter 186 and the packet memory address contained in the packet memory table 187, a read address is generated with an adder 1871. If the value in the table of the STM connection memory 186 is 0, i.e., ATM, the read address will be outputted through an AND gate 1882 and the OR gate 1883.

All counters are reset by the synchronizer 11 over a reset line.

The packet memory table 187 is written by the the label translator 14a, during internal communication by the controller 19.

Data is written into the STM connection memory under control of the controller 19 whenever a connection is set up or released.

Figure 7:
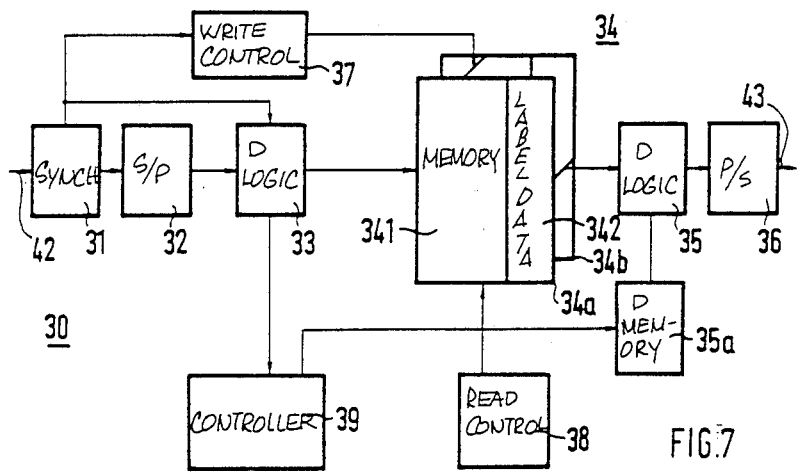
FIG. 7 is a block diagram of an output sorter.

The output sorters 30 are similar in construction and operation to the input sorters 10. Such an output sorter will now be described with the aid of FIG. 7.

The output sorter 30 contains a synchronizer 31, a serial-parallel converter 32, a control data readout logic 33, an output memory 34 consisting of two like parts 34a and 34b, a D-channel insertion logic 35 with an associated D-channel packet memory 35a, a parallel-serial converter 36, a write control 37, a read control 38, and a controller 39. Control packets coming from within the exchange or from the input are separated by the control data readout logic 33 and fed to the controller 39; instead of them, empty packets are forwarded. The D-channel insertion logic 35 inserts D-channel packets coming from the controller 39 and temporarily stored in the D-channel packet memory 35a into the outgoing data stream instead of empty packets. Re-sorting is accomplished by the write control 37, and the read control 38 causes data to be read only serially. Each of the two parts of the output memory 34 is divided into a main portion 341 and a label portion 342; a control-data portion is not necessary here. The main portion 341 contains an information field and an outgoing label for each packet, while the label portion 342 contains the internal label. During readout, the label portion 342 is skipped.

Finally, a preferred embodiment of an asynchronous switching element 24 will be described.

Figure 10:
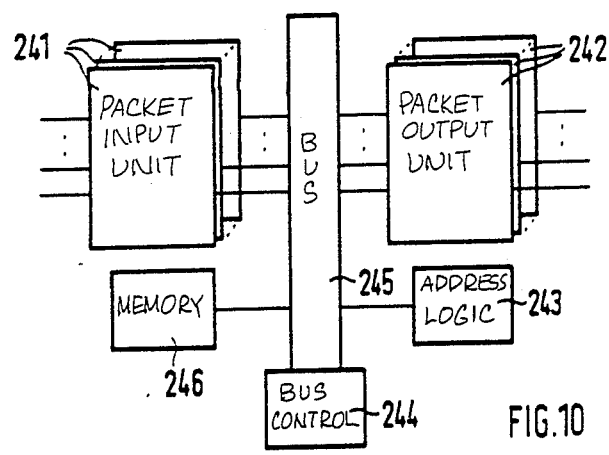
FIG. 10 is a block diagram of an asynchronous switching element for the switching network of FIG. 5, and FIGS. 11 to 14 show further details of the asynchronous switching element of FIG. 10.

As shown in FIG. 10, the asynchronous switching element 24 contains a packet input unit 241 per input line and a packet output unit 242 per output line, a packet memory allocation unit 243, a packet memory 246, a bus control unit 244, and a bus 245.

The packet input units 241 recognize valid ATM cells and are assigned a location in the packet memory 246 by the packet memory allocation unit 243 via the bus 245. The packet output units 242 read the packets from the packet memory 243 and send them to the associated multiplexer 25.

Figure 14:
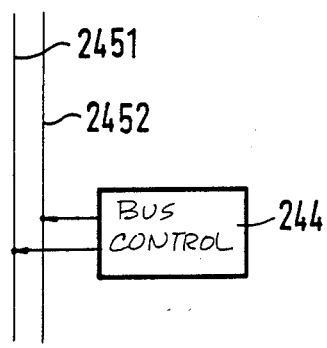

The bus control unit 244 is illustrated in FIG. 14. It is essentially a modulo-N counter, where N is the number of packet input units 241 and packet output units 242. The counter places its count on a packet input control bus 2451 and a packet output control bus 2452, which may be physically identical.

Figure 13:
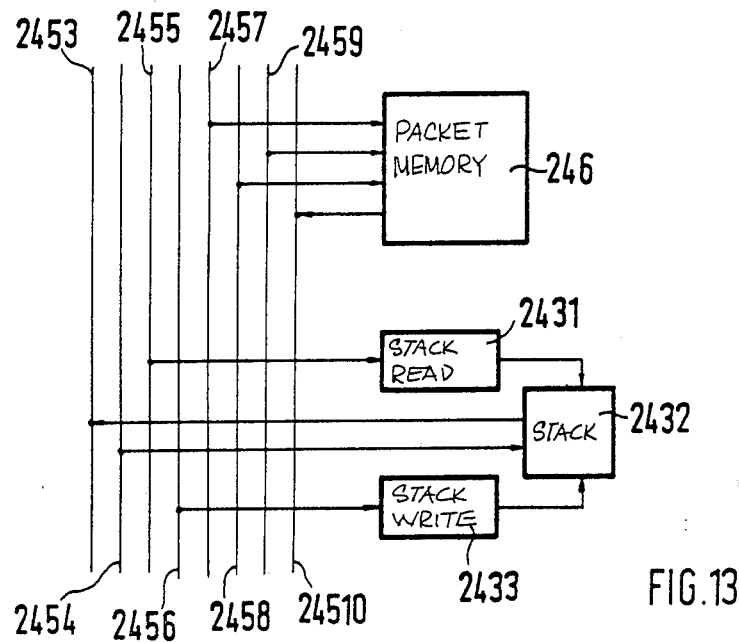

The packet memory allocation unit 243 and the packet memory 246 are shown in FIG. 13. The packet memory allocation unit 243 consists of a stack read control 2431, a packet stack 2432, and a stack write control 2433. Data can be written from the packet input units 241 into the packet memory 246 via a write address bus 2457 and a write data bus 2459, and read from the packet output units 242 via a read address bus 2458 and a read data bus 24510. The stack read control 2431 recognizes the request for a location on a packet indicator line 2455 and causes the packet stack 2432 to place a free memory address on a memory address bus 2453 for the packet input unit 241. The stack write control 2433 recognizes on a return line 2456 the return of a free location and causes the packet stack 2432 to sort the address in on a memory address return bus 2454.

Figure 11:
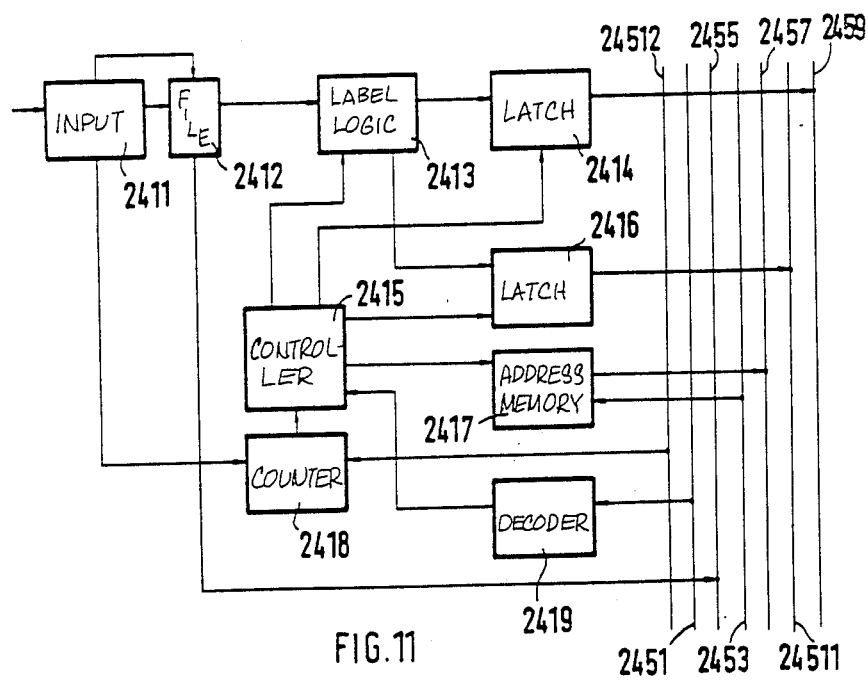

The packet input unit 241 is illustrated in FIG. 11. It consists of an input unit 2411, a packet filter 2412, a label interchange unit 2413, a data latch 2414, a controller 2415, a port latch 2416, a memory-address memory 2417, a counter 2418, and a decoder 2419. The input unit 2411 recognizes the incoming octets, and signals this to the counter 2418. In the first received octet, the packet filter 2412 recognizes an incoming packet (by the PV flag) and requests a free location from the memory allocation unit 243 via the packet indicator line 2455. The counter 2418 signals the reception of a complete label to the controller 2415. The controller 2415 then causes the label interchange unit to cyclically interchange the label and to write the label valid for this stage into the port latch 2416. The data is written into the data latch 2414. The decoder 2419 recognizes the bit cycle via the packet input control bus 2451 and signals this to the controller 2415. The latter causes the data latch 2414 to place the data on the write data bus 2459, and the memory-address memory 2417 to place the memory address on the write address bus 2457. During the transmission of the last octet, the controller 2415 causes the port latch 2416 to place the address of the outgoing port on a port bus 24511.

Figure 12:
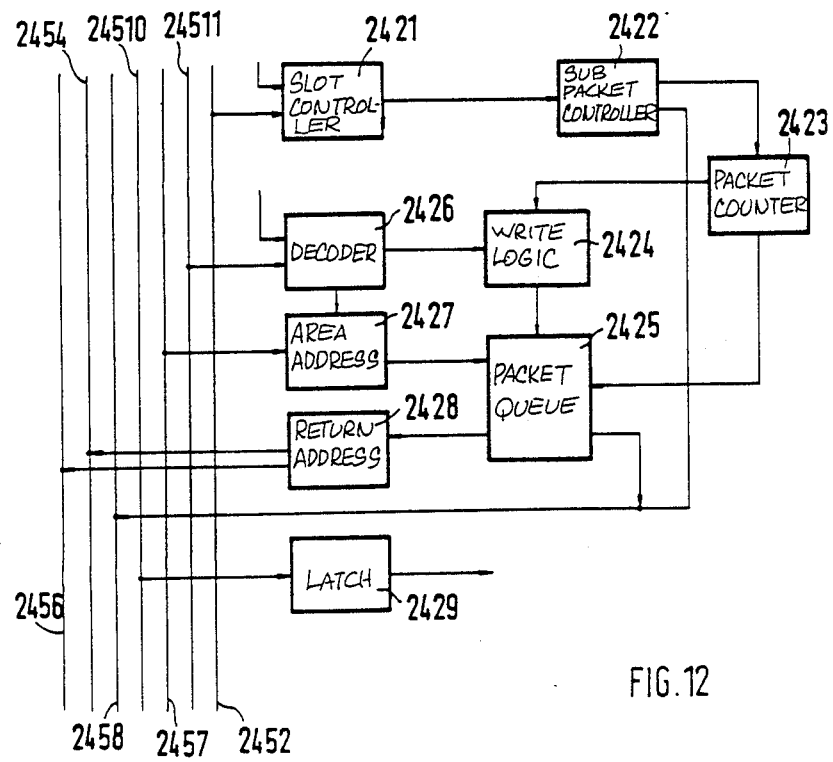

One of the packet output units 242 is illustrated in FIG. 12. It consists of a packet output time slot controller 2421, a packet output decoder 2426, a subpacket counter 2422, a packet counter 2423, a write-in logic 2424, a packet queue 2425, an area address memory 2427, an area address return memory 2428, and an output data latch 2429. The packet output unit 242 has two functions: packet queue management and reading of packets from the packet memory 246. The packet output decoder 2426 recognizes the unit's own address on the port bus 24511. The packet output decoder 2426 then causes the packet start address to be written into the packet queue 2425. When a packet was read, the start address of the vacated memory area location is placed on the memory address return bus 2454 via the area address return memory 2428, and this is signalled on the return line 2456 under control of the packet output time slot controller 2421.

The reading of the packets is controlled by the packet output time slot controller 2421, which clocks the subpacket counter 2422. The overflow of the latter clocks the packet counter 2423. With the start address from the packet queue 2425, the subpacket counter 2422 forms the read address, which is placed on the read address bus 2458. The packet data is written into the output data latch 2429 via the read data bus 24510.

I claim:

1. Method of switching in a multistage switching network both synchronous transfer mode (STM) messages and asychronous transfer mode (ATM) messages packets, said method comprising the steps
dividing the STM messages into STM packets of a first predetermined uniform length contained within a periodic sequence of transmission frames such that
  STM packets derived from different STM messages are included within a single frame,
  each frame comprises a predetermined number of predetermined time intervals, and
  within each frame at least one time interval is made available to each STM message,
dividing each of said STM packets and said ATM message packets into a respective plurality of subpackets each having a second predetermined uniform length equal to said first length divided by a predetermined integer which is greater than one,
using said predetermined integer to divide each said frame into a corresponding predetermined number of subframes,
re-ordering the subpackets associated with a given frame such that successive subpackets derived from a particular said STM packet are separated by subpackets derived from other said packets, the number of subpacket in a subframe being equal to the number of packets in a frame,
sequentially switching each subframe of thus re-ordered subpackets through the multistage switching network, and
after the switching, recombining the subpackets belonging to each packet.

2. A method as claimed in claim 1, wherein each subpacket belonging to a STM message occupies a relative position in its respective subframe corresponding to the relative position of the packet in its respective frame.

3. A method as claimed in claim 2, wherein the subpackets belonging to an ATM message packet are distributed into successive positions of the subframes which are not occupied by subpackets belonging to STM messages.

4. A method as claimed in claim 3, wherein control information and time intervals in any said frame which have no message content are treated like packets belonging to an ATM messages packet.

5. A method as claimed in claim 1 wherein in each stage of the switching network, each of the subpackets belonging to a STM message is translated from a position of an input subframe to a position of an output subframe using synchronous time-division multiplexing.

6. A method as claimed in claim 5, wherein in each stage of the switching network, the subpackets belonging to an ATM message packet are first recombined into a packet and then divided into subpackets again and sorted into those positions of successive output subframes which are not occupied by subpackets belonging to STM messages.

7. Switching apparatus for switching Synchronous Transmission Mode (STM) messages and Packet Switching (PS) packets, said switching apparatus comprising
a multistage switching network having a plurality of input lines and a plurality of output lines,
first means for dividing the STM messages into STM packets of a first predetermined uniform length contained within a periodic sequence of transmission frames such that
  STM packets derived from different STM messages are included within a single frame,
  each frame comprises a predetermined number of predetermined time intervals, and
  within each frame at least one time interval is made available to each STM message,
second means for dividing the STM and PS packets prior to switching into a respective plurality of subpackets each having a second predetermined uniform length equal to said first length divided by a predetermined integer which is greater than one,
third means for re-ordering the subpackets associated within a given frame such that successive subpackets derived from a particular said STM packet are separated by subpackets derived from other said packets,
fourth means for recombining the subpackets belonging to a packet after they have been switched through the switching network,
  wherein said first, second and third means comprise a respective input sorter in each of the input lines which divides all packets into a plurality of subpackets of equal length and re-orders the subpackets in time in such a manner that the frame is divided into a plurality of subframes and that the number of packets in a subframe is equal to the number of packets in a frame, and
said fourth means comprises a respective output sorter in each of the output lines which combines the subpackets belonging to a packet.

8. The switching apparatus claimed in claim 7, wherein each said input sorter comprises
an input memory and
a write and read control for controlling the writing of information into and reading of information from the input memory in such a manner that the frame is divided into subframes.

9. The switching apparatus claimed in claim 7, wherein each said output sorter comprises
an output memory and
a write and read control for controlling the writing of information into and reading of information from the output memory in such a manner that the subframes are combined into frames.

* * * * *

UNITED STATES PATENT AND TRADEMARK OFFICE
CERTIFICATE OF CORRECTION

PATENT NO.   :   4,926,416
DATED        :   May 15, 1990
INVENTOR(S)  :   Hartmut Weik It is certified that error appears in the above-identified patent and that said Letters Patent is hereby corrected as shown below:

Column 1, line 33, change "vol. 42" to -- Vol. 41 --.

Column 2, line 24, change "extend" to -- extent --.

Column 8, line 51, change "bit" to -- bus --.

Column 9, line 22, change "asychronous" to
          -- asynchronous --.
Column 9, line 45, change "subpacket" to -- subpackets --.
Column 9, line 66, change "messages" to -- message --.

Column 10, line 15, change "Switching" to -- Switched --.
Column 10, line 33, change "within" to -- with --.

Signed and Sealed this

Twenty-fourth Day of November, 1992

Attest:

DOUGLAS B. COMER

*Attesting Officer*    Acting Commissioner of Patents and Trademarks